United States Patent
Dunn

(10) Patent No.: US 7,188,252 B1
(45) Date of Patent: Mar. 6, 2007

(54) USER EDITABLE CONSENT

(75) Inventor: Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 734 days.

(21) Appl. No.: 10/458,465

(22) Filed: Jun. 10, 2003

(51) Int. Cl.
*G06F 9/00* (2006.01)

(52) U.S. Cl. .................. 713/182; 713/193; 713/164; 713/165

(58) Field of Classification Search .............. 713/182, 713/193, 164, 165
See application file for complete search history.

(56) References Cited

U.S. PATENT DOCUMENTS

| | | | |
|---|---|---|---|
| 5,544,322 A | 8/1996 | Cheng et al. |
| 6,064,666 A | 5/2000 | Willner et al. |
| 6,065,120 A | 5/2000 | Laursen et al. |
| 6,070,243 A | 5/2000 | See et al. |
| 6,275,944 B1 | 8/2001 | Kao et al. |
| 6,381,579 B1 | 4/2002 | Gervais et al. |
| 6,463,533 B1 | 10/2002 | Calamera et al. |
| 6,466,932 B1 | 10/2002 | Dennis et al. |
| 6,820,201 B1 | 11/2004 | Lincoln et al. |
| 6,941,475 B1 | 9/2005 | Assetto et al. |
| 6,985,955 B2 | 1/2006 | Gullotta et al. |
| 2002/0091639 A1 | 7/2002 | Mandahl et al. |
| 2002/0104015 A1 | 8/2002 | Barzilai et al. |
| 2005/0240622 A1 | 10/2005 | Cheung |

OTHER PUBLICATIONS

Grover et al., "E-Commerce and the Information Market," Communications of the ACM, Apr. 2001, vol. 44, Issue 4, ACM Press, New York, U.S.A.

*Primary Examiner*—Thomas R. Peeso
(74) *Attorney, Agent, or Firm*—Senniger Powers

(57) ABSTRACT

Methods and system managing consent between client and network server. A user interface requests information from a user in response to a request from the network server for consent to use the information. After receiving the information, the network server is allowed access to the information received from the user. In one embodiment, the user interface displays information previously stored in a user profile associated with the user and provides a form field for editing the user-specific information previously stored in the user profile. The user can provide information via the form field. Other aspects of the invention are directed to computer-readable media for use with user editable consent.

46 Claims, 9 Drawing Sheets

FIG. 6A

SEE ALSO

⇧ PRIVACY POLICY
⇧ VIEW YOUR PER-SITE CONSENT SETTINGS
⇧ CHANGE YOUR PROFILE INFORMATION

HELP | SIGN OUT

YOU ARE SIGNED IN AS username@A.com

SHARE PROFILE INFORMATION WITH SERVICE A

BEFORE YOU SIGN IN, WE NEED YOUR CONSENT TO SHARE INFORMATION FROM YOUR USER PROFILE WITH SERVICE A. SERVICE A NEEDS THIS INFORMATION TO SHOW YOU LOCAL INFORMATION AND PERSONALIZED CONTENT. MEMBER SERVICES MAY ALSO USE THIS INFORMATION TO:
- BETTER MATCH ITS CONTENT AND SERVICES TO YOUR INTERESTS.
- INFORM OTHER SITES ABOUT YOU, AS STATED IN SERVICE A'S *PRIVACY POLICY*.

TO SIGN IN TO SERVICE A, YOU MUST CONSENT TO LET US SHARE THE INFORMATION THAT SERVICE A REQUIRES. WE WILL AUTOMATICALLY SHARE THIS INFORMATION EACH TIME YOU SIGN IN TO SERVICE A. IF YOU WANT TO SHARE ADDITIONAL INFORMATION, CLICK YES NEXT TO THE OPTIONAL ITEMS BELOW.
VIEW OR EDIT YOUR PROFILE BEFORE CONSENTING TO SHARE WITH SERVICE A. **WE AUTOMATICALLY SAVE ANY CHANGES YOU MAKE IN YOUR PROFILE AND IN YOUR *CONSENT HISTORY* FOR SERVICE A.**

| PERSONAL INFORMATION | FIRST NAME | MICHAEL | *WILL BE SHARED* |
| | LAST NAME | | *WILL BE SHARED* |
| | GENDER | MALE ○ FEMALE ○ | SHARE? YES ○ NO ⦿ |

| CONTACT INFORMATION | CONTACT E-MAIL | | *WILL BE SHARED* |

| LOCATION INFORMATION | ZIP CODE | | SHARE? |
| | COUNTRY/REGION | USA ▽ | YES ○ NO ⦿ |
| | STATE | WASHINGTON ▽ | YES ○ NO ⦿ |

CLICK CONTINUE TO AGREE TO SHARE THIS INFORMATION WITH SERVICE A. SERVICE A MAY STORE YOUR INFORMATION INDEFINITELY. YOU CAN CHANGE OR DENY CONSENT TO LET US SHARE YOUR INFORMATION WITH SERVICE A BY VISITING MEMBER SERVICES AT A.COM. EDITING YOUR PROFILE, OR CHANGING OR DENYING CONSENT FOR US TO SHARE INFORMATION AT A LATER TIME DOES NOT REQUIRE SERVICE A TO SAVE YOUR CHANGES OR DELETE INFORMATION THAT YOU'VE ALREADY SHARED.

[CONTINUE] [CANCEL]

FIG. 6B

HELLO, username@a.com
NOT YOU? SIGN IN WITH A DIFFERENT IDENTIFIER.                    HELP EDIT THE PERSONAL PROFILE ASSOCIATED WITH
username@A.com
THIS PAGE CONTAINS ALL THE PERSONAL INFORMATION THAT YOU PROVIDED TO THE PERSONAL PROFILE SERVICE. WE ALWAYS ASK YOUR CONSENT BEFORE SHARING ANY PIECE OF THIS INFORMATION WHEN YOU VISIT ANY AFFILIATED SITE.

→ *VIEW OR CHANGE YOUR CONSENT HISTORY.*

YOU CAN CHANGE ANY OF THIS INFORMATION AS YOU WISH, BUT YOU DO HAVE TO CLICK THE "SAVE" BUTTON TO HAVE THE CHANGES COMMITTED TO THE PERSONAL PROFILE SERVICE.

| | |
|---|---|
| FIRST NAME | [ ] |
| LAST NAME | [ ] |
| LANGUAGE | [SELECT ONE ▽] |
| COUNTRY/REGION | [SELECT ONE ▽] |
| REGION/STATE | [SELECT ONE ▽] |
| POSTAL CODE/ZIP | [ ] |
| TIME ZONE | [SELECT ONE ▽] |
| TIME ZONE | [SELECT O ▽] [SELECT O ▽] [ ]  FOR EXAMPLE, 1999 |
| GENDER | MALE ○ FEMALE ○ NOT SPECIFIED ⦿ |
| OCCUPATION | [SELECT ONE ▽] |

[CLEAR ALL]                                    [SAVE] [CANCEL]

FIG. 6C

```
HELLO, username@A.com                                              HELP
NOT YOU? SIGN IN WITH A DIFFERENT IDENTIFIER.

SHARE PERSONAL INFORMATION WITH <AFFILIATE NAME>
<AFFILIATE NAME> NEEDS SOME INFORMATION FROM YOU SO THAT THEY CAN PROVIDE
YOU WITH PERSONALIZED SERVICES.
YOU CAN ASK US TO ADD THE ITEMS MARKED WITH [→] TO YOUR USER PROFILE.
(ADDING INFORMATION TO YOUR USER PROFILE CAN MAKE REGISTRATION AND SIGN-
IN FASTER AT PARTICIPATING SITES.)

WHAT HAPPENS TO THE INFORMATION THAT I SHARE ?

NOTE IF YOU CLICK CANCEL, YOU MAY BE ABLE TO SIGN IN BUT YOU MAY BE UNABLE
TO USE THE SITE'S SERVICES.
```

| | |
|---|---|
| FIRST NAME | FIELD CONTENT |
| LAST NAME | FIELD CONTENT |
| LANGUAGE | FIELD CONTENT |
| COUNTRY/REGION | FIELD CONTENT |
| REGION/STATE | FIELD CONTENT |
| POSTAL CODE/ZIP | FIELD CONTENT |
| TIME ZONE | FIELD CONTENT |
| TIME ZONE | FIELD CONTENT |
| GENDER | FIELD CONTENT |
| OCCUPATION | FIELD CONTENT |
| ADD TO USER PROFILE | ☐ I WANT TO ADD THE ITEMS MARKED WITH [→] TO MY USER PROFILE. |

[→] I WANT TO VIEW OR CHANGE MORE ITEMS IN MY USER PROFILE.

[CONTINUE]  [CANCEL]

USER EDITABLE CONSENT

TECHNICAL FIELD

Embodiments of the present invention relate to the field of computer network environments. In particular, embodiments of this invention relate to easily providing user edits to stored user information used by related applications or sites that are affiliated with a multi-site user authentication system.

BACKGROUND OF THE INVENTION

Web sites, or Internet sites, very often provide information, products, services, and the like to their users. Many web sites require users to "register" before their web servers will grant access to the users. During registration, a user typically supplies personal information such as username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

Using a presently available multi-site user authentication system (e.g., Microsoft® .NET™ Passport single sign-in service), a web user can maintain a single login ID (and associated password) for accessing multiple, affiliated web servers or services. Such a system permits the user to establish a unique account identified by, for example, an e-mail address.

Large Internet service providers often have many different web sites through which they offer services to consumers. Moreover, a single web service can actually be made up of many different content providers. For instance, ESPN® sports network is a premium service content provider with an MSN® Internet services subscription. Other sites may be used to provide content related to children's interests, e-shopping, news, and so forth. Consumers usually perceive these related sites as being essentially the same service. Further, as Internet usage migrates to a subscription-based model that includes content and services from a variety of different sites, the need exists for accurately sharing common information (e.g., billing and subscription information) between related sites.

As described above, a web site very often gathers personal information about its users for later use. A typical privacy statement for a web site describes how the site protects and uses personal information. The policy will likely specify first what information the site collects. For example, the site may maintain a profile for the user including information such as the user's e-mail address, first and last name, country or region, state or territory, ZIP code or postal code, language preference, time zone, gender, birth date, occupation, telephone number(s), credit card information, billing and shipping addresses, password, PIN, secret question and secret answer, clothing sizes, music preferences, and the like. Inasmuch as this profile information can be quite sensitive, the typical policy also specifies how the information will or will not be used. For example, a web site's privacy policy may forbid the site from selling or renting a user's personal information without prior consent. The same policy, however, may detail a number of permitted uses (e.g., resolving customer support inquiries, performing statistical analyses of the site's services, conforming to legal requirements, protecting the personal safety of users or the public). A typical policy often specifies certain circumstances under which disclosures or uses of information are permitted and those other circumstances under which they are not.

User profile information is often out-of-date or incomplete. This typically occurs because people tend not to think about updating online information or about filling in more information than may be required at the time. Unfortunately, the end user must repeatedly fill in or correct the profile information manually for various sites/services. The lack of current information devalues the purpose of having a profile store.

Accordingly, a solution is needed that allows an end user to edit information in his or her profile as part of the initial consent process.

SUMMARY OF THE INVENTION

Embodiments of the invention overcome one or more deficiencies in the prior art by providing, among other things, improved sharing of information among related sites. A user interface according to an embodiment of the invention allows a user to edit information in his or her profile as part of a first time consent process. Giving the end user the ability to update, delete, and/or add information during the process of sharing that information helps keep the information in the profile store up-to-date. In particular, one embodiment of the present invention effectively provides open profile fields in a user interface for directly entering changes or new information. The invention advantageously permits changes to the user profile via an edit profile option presented on the first time consent page. The edit profile option takes the user to a standardized edit profile page before returning the user to the first time consent page to finish granting or denying consent. Moreover, the features of the present invention described herein are less laborious and easier to implement than currently available techniques as well as being economically feasible and commercially practical.

Briefly described, a method embodying aspects of the invention manages consent between a client and a network server coupled to a data communication network. In this method, the network server provides one or more services to a user via the client, which operates a browser configured to permit the user to communicate on the network. The method includes providing, by a central server on the network, a user interface via the browser to request information from the user in response to a request from the network server for consent to use the information. The method also includes receiving information provided by the user via the user interface in response to the request for consent and allowing access by the network server to the information received from the user.

In another embodiment, an authentication system has an authentication server coupled to a data communication network and an authentication database associated with the authentication server. The authentication database stores authentication information for comparison to login information provided by a user for authenticating the user. The authentication database also stores user-specific information identifying the user with respect to services provided by at least one affiliate server coupled to the data communication network. In this instance, the affiliate server provides the services to the user via a client coupled to the data communication network. The authentication server of the system is configured to receive a request from the user for a service to be provided by the affiliate server and to authenticate the user responsive to the request when login information retrieved from the user via the data communication network matches the authentication information stored in the authentication database. The authentication server also provides a user interface to request information from the user in response to a request from the affiliate server for consent to use the information, receives information provided by the user via the user interface in response to the request for consent, and allows access by the affiliate server to the information received from the user.

Yet another embodiment of the invention is directed to a method of managing consent to user information in computer system having a graphical user interface with a display and a user interface selection device. The method includes sending information previously stored in a user profile associated with the user to a client for displaying to the user, providing a form field for editing the user-specific information previously stored in the user profile, and receiving information provided by the user via the form field. In this embodiment, the form field is displayed in response to a request from a network server for consent to use selected information from the user profile.

In yet another embodiment, computer-readable media have computer-executable components for managing consent between a client and a network server coupled to a data communication network. In this instance, the network server provides services to a user via the client. The computer-readable media include a user interface component, an editing component, and a consent component. The user interface component requests information from the user in response to a request from the network server for consent to use the information. The editing component in this embodiment receives information provided by the user via the user interface component. The consent component then allows access by the network server to the information received from the user.

Computer-readable media having computer-executable instructions for performing methods of sharing information embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 6A, FIG. 6B, and FIG. 6C illustrate exemplary user interfaces for accepting real time edits as part of a first time consent process according to embodiments of the invention.

Corresponding reference characters indicate corresponding parts throughout the drawings.

DETAILED DESCRIPTION OF THE INVENTION

Figure 1:
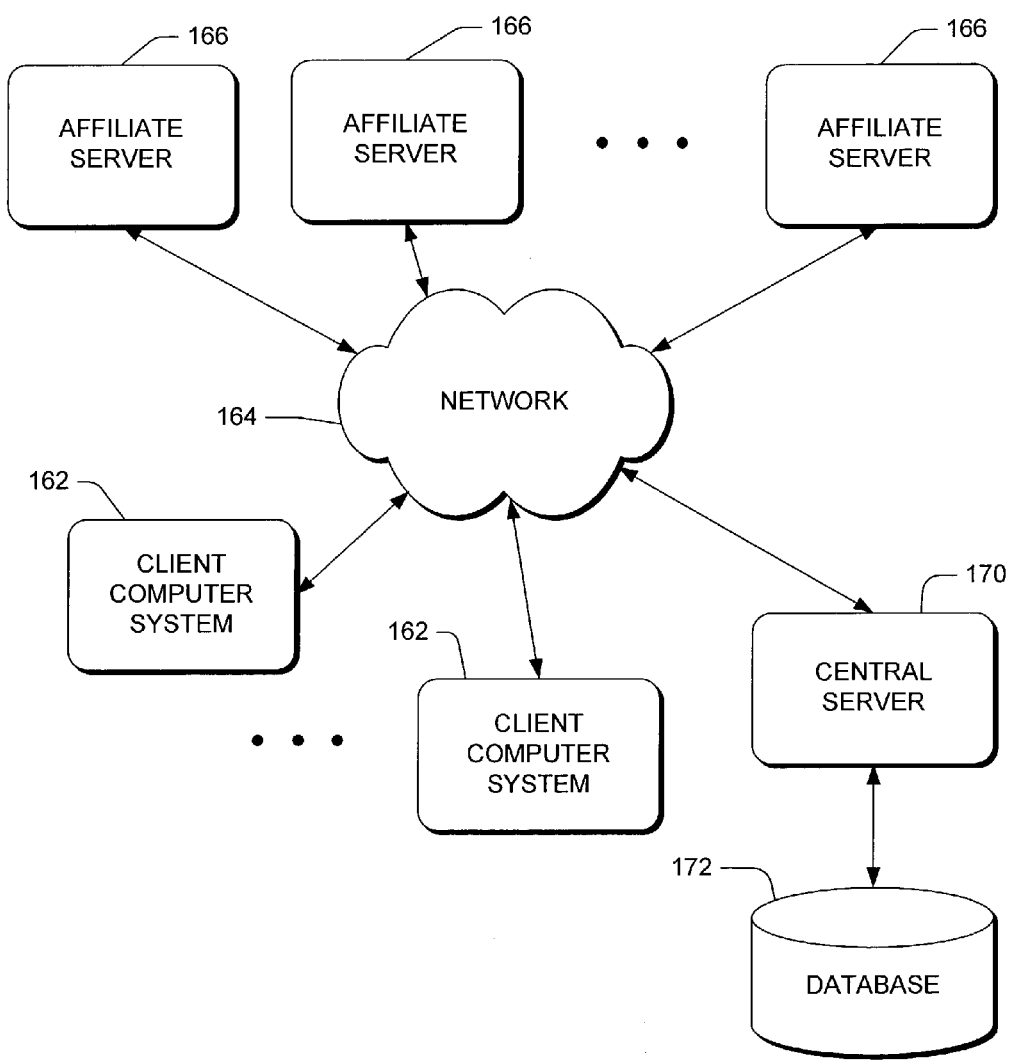
FIG. 1 is a block diagram illustrating an exemplary network environment in which the present invention may be utilized.

Referring now to the drawings, FIG. 1 illustrates an exemplary network environment in which the present invention may be utilized for managing permissions and user profile information. The invention relates to cross-internet collaboration between web sites as part of, for example, a distributed, multi-site user authentication system (e.g., Microsoft® .NET™ Passport sign-in service). Such services provide a user with the ability to access one or more participating web sites or resources with a single sign-in. Although the participating sites (referred to herein as "affiliates" or "affiliate sites") maintain control over permissions, they use the authentication service rather than hosting and maintaining their own proprietary authentication systems.

Those skilled in the art are familiar with the use of profiles for storing user-specific information. As a part of the single sign-in service, for example, the user can choose to store information in a user profile. Typical user profile information includes name, address, gender, occupation, preferred language, credit card information, billing address, shipping address, telephone numbers, and the like. At the user's option, the sign-in service makes all or part of the user profile information available to participating sites visited by the user. In one embodiment, the user is redirected from the sign-in service back to the desired affiliate site with an encrypted authentication ticket and profile information attached. This enables affiliate sites to customize and enhance user experience without having to prompt for information.

As described above, user profile information can quickly become out-of-date and is often incomplete, which devalues the purpose of maintaining a profile store. A user interface (UI) of the invention allows an end user to edit information in his or her profile as part of a first time consent process. Giving the end user the ability to update, delete, and/or add information during the process of sharing that information helps keep the information in the profile store up-to-date. As a result, the web site/service not only has more information on the user but has better information as well.

One embodiment of the invention provides open profile fields in the UI. The user can edit the information in the open profile fields and save the changes when he or she either grants or denies consent to the site that initiated the first time consent process. In an alternative embodiment, the UI contains an edit option, which takes the user to the standard edit profile page when selected before returning the user to the first time consent page to finish granting or denying consent.

In FIG. 1, one or more client computer systems 162 are coupled to a data communication network 164. In this exemplary embodiment of the invention, the network 164 is the Internet (or the World Wide Web). However, the teachings of the present invention can be applied to any data communication network. Multiple affiliate servers 166 are also coupled to network 164. The affiliate servers 166 may be referred to as "web servers" or "network servers" generally.

A central server 170 coupled to network 164 allows communication between itself, client computer systems 162, and web servers 166. In operation, one or more client computer systems 162 can access affiliate servers 166 via network 164. Although sometimes referred to as an "authentication server" in connection with FIG. 1, the central server 170 in the illustrated embodiment is also a web server capable of interacting with web browsers and other web servers. In this example, server 170, client computer systems 162, and web servers 166 communicate data among themselves using the hypertext transfer protocol (HTTP), a protocol commonly used on the Internet to exchange information.

FIG. 1 further illustrates a database 172 coupled to server 170. In one embodiment, the database 172 contains information (i.e., credentials) necessary to authenticate a registered user of one of the client computer systems 162 (as well as other users on the network). The database 172 also maintains a profile store for registered users and identifies which elements of the user profile information should be provided to a particular affiliate server 166 when the user accesses its service. In general, a credential is a means for generating an authenticated reference to a single account identifier. For example, an EASI (E-mail As Sign-In) sign-in name and password, a mobile phone number and PIN, and a biometric signature are all credentials that can be associated with the same profile data. The sites/services of affiliated servers 166 may employ a common privacy statement of a hosting service or use entirely different policies.

Although database 172 is shown in FIG. 1 as a single storage unit separate from central server 170 for convenience, it is to be understood that in other embodiments of the invention, database 172 may be one or more memories contained within or separate from server 170. In a federated environment, for example, a plurality of servers 170 may be used to provide authentication, shared services management, policy and permissions management, and the like.

The server 170, as described herein, may be part of an authentication system that authenticates a user of client computer 162 seeking access to a particular one of the affiliate servers 166. In this embodiment, server 170 first requests authenticating login information from the user, such as the user's login ID and password. If the user is successfully authenticated, the server 170 of FIG. 1 routes the user's client computer 162 to the appropriate affiliate server 166 for performing a desired service for the user.

Prior to executing the authentication process, both the user of client computer system 162 and the operator(s) of affiliate servers 166 "register" with server 170. This registration is a one-time process that provides necessary information to the authentication system. According to one embodiment of the invention, this registration also provides the user with his or her first opportunity to grant consent for the sharing of certain personal information. The user of client computer system 162 registers with server 170 by providing information about the user and/or client computer system 162, such as, the user's name, mailing address, and e-mail address. As part of the user registration process, the user is assigned (or selects) a login ID, which is a common login ID, used to access any affiliate server (e.g., server 166). The login ID may also be referred to herein as a "username," "member name," or "login name".

Additionally, the user selects a password associated with the login ID that is used for authentication purposes. After registering and logging into server 170, the user can visit any affiliate server 166 (i.e., affiliate servers that are also registered with the same authentication server) without requiring any additional authentication and often without re-entering user information that is already contained in the associated user profile. The present invention sets forth identifying the user account, or profile, by a unique account identifier.

The central server 170 of FIG. 1, i.e., the authentication server in this embodiment, validates the username/password provided by the user. Server 170 handles the authentication response by comparing the login data to the entries in database 172. If the username and password match an entry in the database 172, the user is authenticated. A unique identifier (e.g., Passport Unique Identifier (PUID)) and a user profile corresponding to the authenticated user are extracted from the database. In this embodiment, when a user registers an account, the account is assigned a PUID that becomes the unique identifier for the account. The PUID is, for example, a 64-bit number that the authentication server sends (e.g., encrypted) to affiliate site 166 as the authentication credential when the user signs in. This unique identifier makes it possible for the site to determine whether the user is the same person from one sign-in session to the next.

Related sites or services are referred to herein as a "service group" or "shared services group" because they represent a group of independent sites IDs that together provide a user with a set of services. As an example, ESPN® sports network is a premium service content provider with an MSN® Internet services subscription. Shared services groups, however, need not employ the same policies regarding permissions. As used herein, "policy group" or "consent group" refers to a predefined group of sites (or applications generally) that have a shared permissions set, that is, they share a common set of permission standards (e.g., a common privacy policy).

Administrative groups support the scenarios in which a user who has authority over the authorization settings or permissions of one or more other users. Such groups include, for example, parents, managers, users who control multiple credentials, and domain space administrators. One of several administrative groups, a service group consists of site IDs representative of related sites on the network that work together to provide the user with a consistent set of services. Members of a service group, however, need not share the same privacy statement. When this is the case, the user typically consents to the sharing of user-provided data with each policy group represented within the service group. There should be a contractual arrangement providing the user with a known set of services.

One such situation is when a network of Internet services provides premium content through an affiliated site (e.g., Walt Disney Company and ESPN, Inc. currently provide premium content sites on the MSN® network of Internet services). Operational information that may be maintained by one site (e.g., MSN.com) but accessible to both the one site and another related site (e.g., MSN.com and Disney-.com), indicates that the user has, for example, a premium content subscription. This information allows the user to move between content providers without having to re-authenticate or prove membership as a premium content subscriber. Further, multi-company corporations can be represented as a service group when they do not share a corporate privacy statement. This might be when a financial company owns both banks and insurance companies and it wants the user to be able to move between the different companies without having to re-authenticate or prove membership.

On the other hand, a policy group consists of sites/services that operate under a shared privacy or other permissions policy. The policy group, which is another form of administrative group, implements first time login consent scenarios. By grouping applications, such as particular web services, having the same policy, an embodiment of the invention allows a user to grant consent to share information with all members of the policy group the first time the user signs in to any member of the group. If a particular site does not share a privacy statement with any other site, then its site ID can be considered to be a policy group of one.

Figure 2:
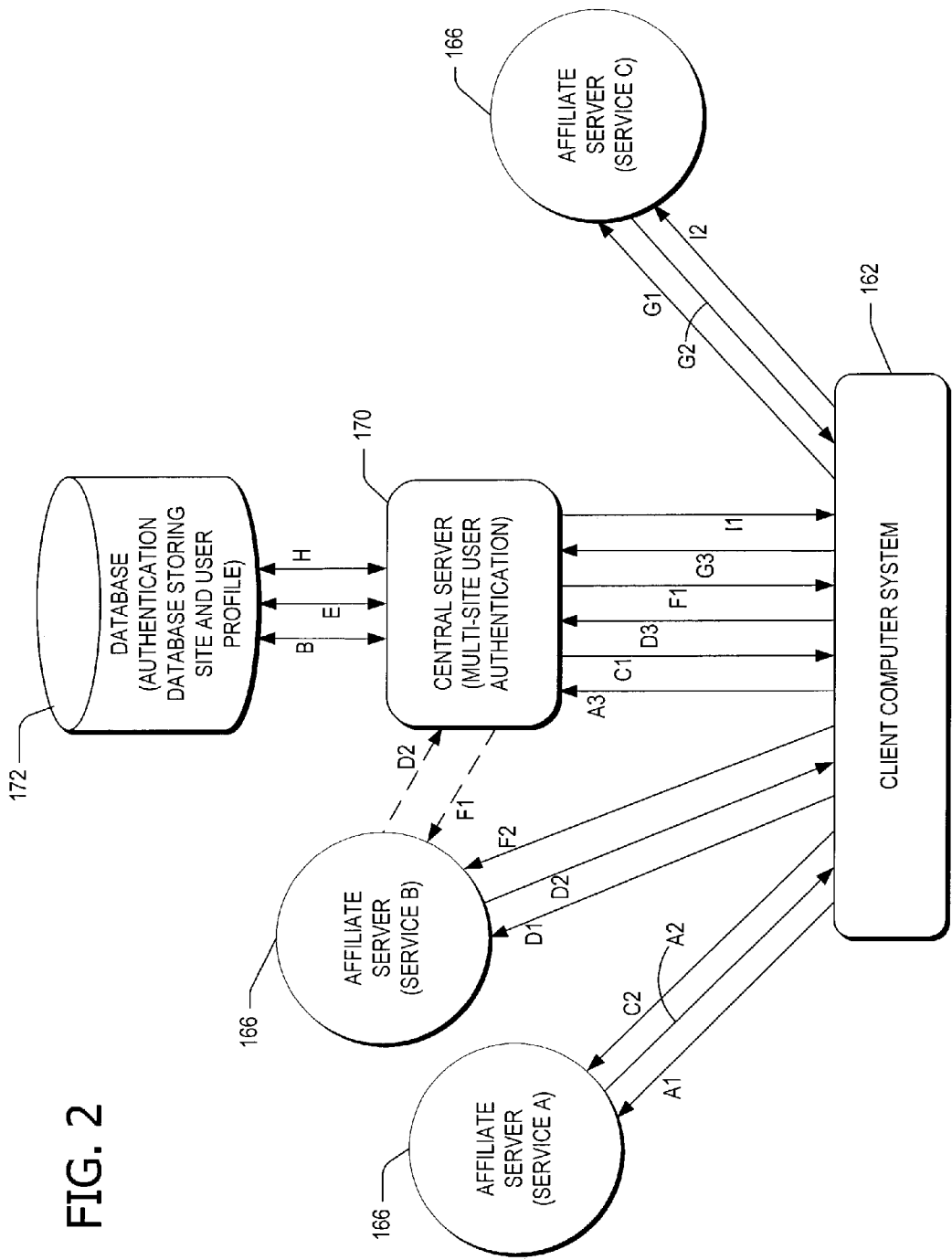
FIG. 2 is a block diagram illustrating an exemplary interaction between client computer, affiliate servers, and central server of FIG. 1.

FIG. 2 is an exemplary flow diagram illustrating an implementation of the present invention and the interaction between server 170, multiple client computer systems 162, and at least one affiliate server 166. The illustrated example of FIG. 2 describes the situation in which the user of client computer system 162 has not yet logged into affiliate server 166 and has not yet been registered or authenticated by server 170. The lines in FIG. 2 labeled "A" through "I" represent the flow of information or activities during the process. The arrows on the lines indicate the direction of the process flow. In this example, the label "A" represents the beginning of the processes and the label "I" represents the end of the process.

In the exemplary process flow of FIG. 2, Service A and Service B form one shared services group. Service A and Service C form another service group. Service A and Service B also share a common privacy policy and, thus, are in a policy group together. The user, shown at client computer 162, navigates to a first selected service, namely, Service A (see A1). As an example, Service A represents an Internet portal service to which the user is signing in for the first time. Server 170 initiates sign-in and seeks first time consent from the user to disclose or use certain information in the user's profile (see A2/A3). The central server 170 also either stores the user's credentials for the first time or verifies the previously stored information (see B). Further, server 170 creates a ticket containing: (a) user profile information that the user has agreed to share with Service A; (b) operational information specific to Service A; and (c) operational information that is shared between Service A and Service B (e.g., the user's status as a premium subscriber to Service B's content). If the shared services groups are established ahead of time, the user is signed in to Service A (see C1/C2) with both Service A specific and Service B and Service C shared operational information. In this instance, FIG. 2 further represents the user's first time consent to the privacy policy of service A (see A2/A3).

When the user navigates to a content provider such as a Service B (see D1), server 170 silently authenticates the user (see D2/D3) inasmuch as the user is navigating within a shared services group. Moreover, Service A and Service B share a common privacy policy so that the user need not grant separate permission to Service B. In a similar manner, the server 170 as shown in FIG. 2 verifies the user (see E) and creates a ticket containing: (a) user profile information that the user has agreed to share with Service B; (b) operational information specific to Service B; and (c) operational information that is shared between Service A and Service B. Central server 170 permits the user to sign in to Service B (see F1/F2) with both Service B specific and Service A shared operational information. However, Service B does not have access to information in the client specific to Service A or shared by Service A and Service C. The user need not know that the system has routed him or her to another site because of the shared services and shared privacy policy arrangements.

In this exemplary process flow of FIG. 2, the user navigates to Service C (see G1) and is asked to re-authenticate (see G2/G3) because the immediately preceding site was in a different shared services group. As part of an authentication system, central server 170 verifies the user (see H) and creates a ticket containing: (a) user profile information that the user has agreed to share with Service C; (b) operational information specific to Service C; and (c) operational information that is shared between Service A and Service C. The server 170 signs in the user to Service C (see I1/I2) with both Service C specific and Service A shared operational information. As above, Service C does not have access to information specific to Service A or shared by Service A and Service B. In the event this is the user's first visit to Service C, the user will again have to go through a first time consent process because Service C is not in the policy group with Services A and B. Even if Service C belonged to the same service group as Services A and B, the consent process would be necessary because Service C employs a different privacy policy in this example.

Figure 3:
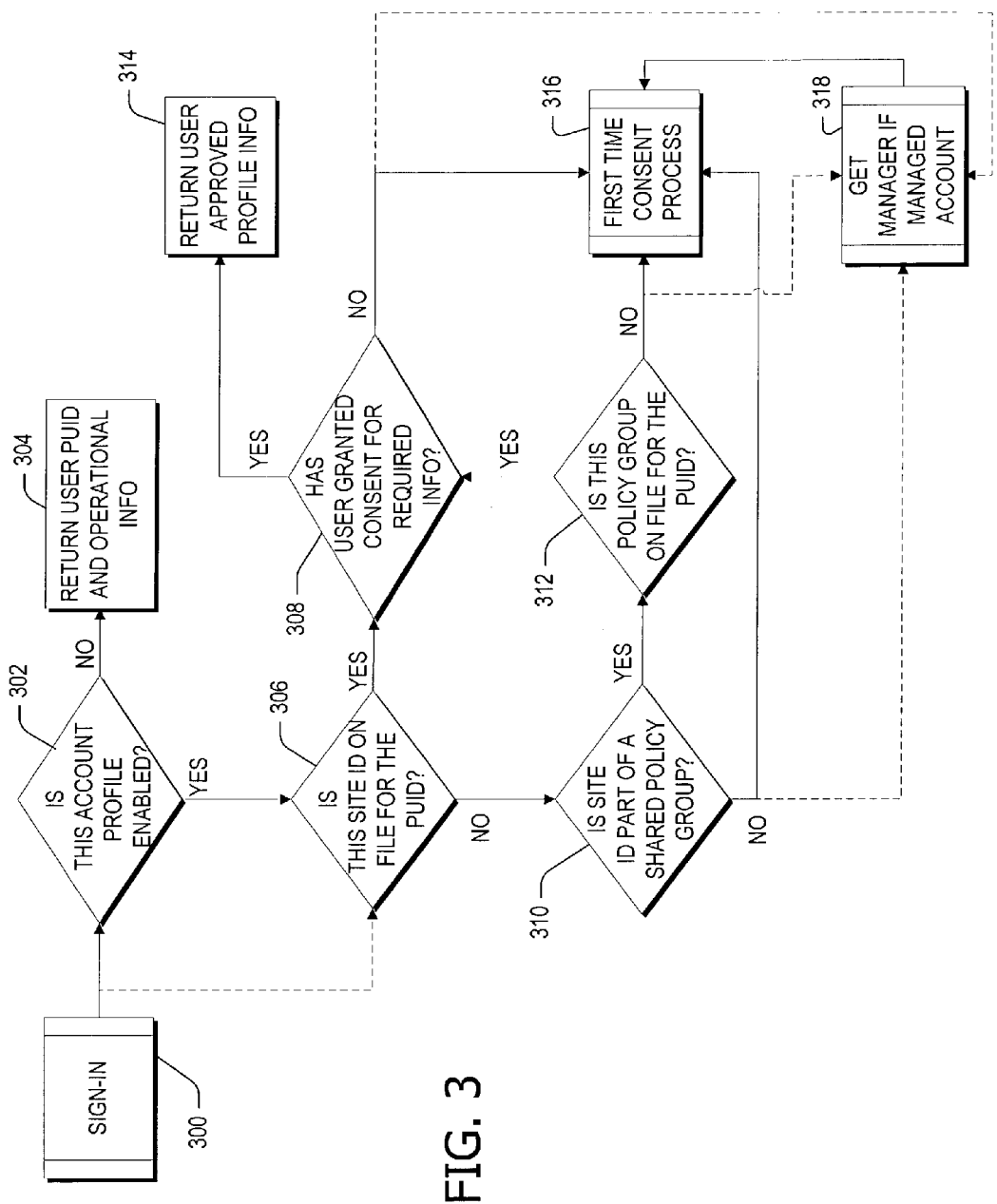
FIG. 3 is an exemplary flow diagram illustrating process flow according to one embodiment of the invention.

Referring now to FIG. 3, an exemplary flow diagram illustrates logical flow for first time consent according to the invention. Beginning at 300, the user signs in to Service A using an authentication system as described herein. Based on the user's unique identifier (e.g., a PUID), server 170 authenticates the user of client computer 162 seeking access to a particular one of the affiliate servers 166, namely, the network server providing Service A. When performing an authentication, server 170 first requests authenticating login information from the user, such as the user's login ID and password.

In one embodiment, the user signs in to the single sign-in service at the participating affiliate site/service 166. If central server 170 determines at 302 that the user's account is not profile-enabled, operations bypass the consent process because there is essentially no information to consent to share. As shown in FIG. 3, server 170 proceeds to 304 and simply returns the user's associated PUID and any appropriate operational information to affiliate server 166. On the other hand, if the user is successfully authenticated and signed in at 300, server 170 proceeds to 306 to determine if the site ID for a particular service is on file and corresponding to the user. In particular, server 170 searches its associated database 172 for permissions or other consent information linked to the user ID and the site ID. In other words, after the user signs in to a site/service, the invention determines whether the specific site ID is listed with the user PUID as having been granted consent for the requested elements.

At 308, server 170 determines if the user has already granted consent for all of the requested elements to be used. In the event the site ID is not on file for the user, the central server 170 proceeds to 310 to determine whether the site ID is part of a policy group. As described above, a group of related sites/services may be predefined as a shared policy group if they use the same permissions set (e.g., privacy policy). In this instance, each member of the policy, or consent, group employs exactly the same privacy policy.

According to the illustrated embodiment, the consent mechanism uses the policy group information to determine to which policy group the currently authenticated site belongs and to what information the user has currently granted access for that policy group. If the site ID is in a policy group, server 170 asks at 312 of FIG. 3 whether the policy group is on file for the user (as represented by his or her corresponding PUID). In other words, server 170 seeks to answer whether the user granted consent with respect to a different site ID that happens to be in the same policy group (i.e., has the same privacy policy) as the present site ID.

Referring further to FIG. 3, if the user granted consent to the site ID at 308 for the requested elements, then the profile information for which consent was granted, if available, is returned at 314 to the requesting site/service. Otherwise, the consent process continues normally at 316. In other words, if the user has granted insufficient consent for the requested informational elements, as determined at 308, then central server 170 initiates a first time consent process at 316. Similarly, if central server 170 determines at 310 that the site ID is not part of a recognized policy group, operational flow proceeds to the first time consent process at 316.

FIG. 3 also shows operational flow when the user has not previously granted any consent. As a result of this initial check, server 170 proceeds to 316 if the user has not already granted consent for the site ID. As part of the overall determination, the invention still tries to find the site ID in a policy group (see 310) and determines whether the policy group has any permissions in place from the user (see 312). If the invention determines that the user did not grant consent for either the site ID or the policy group, the consent process continues normally at 316.

Although described in the context of affiliated web sites/services, it is to be understood that the invention is applicable to applications generally, as represented by application values or IDs.

First time consent is a feature of a single sign-in service according to one or more embodiments of the invention that allows the user to determine whether or not to share user profile information with participating sites/services. As an example, when a user navigates to a desired site for the first time, the site presents the user with its first time consent page indicating that it requires the user's non-identifying information and would like his or her e-mail address. In this instance, the multi-site user authentication service (i.e., central server 170) updates the user's profile and may perform a check for site membership in an administrative group. The authentication service writes consent information to the user profile indicating, for example, PUID, site ID and/or policy group ID as appropriate, agreed upon intentions, elements set to share, and retention policy. Finally, the authentication service in this example sends the selected and required information to the site.

According to one embodiment of the invention, the first time the user navigates to a participating site/service to which the user has granted consent for use of the profile information, the user is shown a page containing information such as what the user will receive in exchange for the information, the secondary uses for the information (e.g., aggregated analysis), with whom the information will be shared, how long the information will be retained by the site/service, and whether the user will be able to access the information and make corrections as necessary. In essence, first time consent breaks down the participating site/service privacy policy into an easy to understand format. Exemplary profile elements include: "contact me at" e-mail address; first and last name; gender; birth date; country; language; occupation; city; state; and postal code.

Further to the foregoing example, a first time consent page may be partially completed when the user navigates to an affiliated site for the first time. Advantageously, the first time consent page permits the user to correct any errors in the information, set which information is to be shared, and update his or her profile accordingly. In this instance, the authentication service of server 170 updates the user's profile in database 172 because the selected option explicitly requested this operation.

Often, the site at affiliate server 166 collects more information than is stored in the user profile associated with the multi-site authentication service of server 170. When the user signs in to the affiliate service for the first time, the invention in this example presents the user with the consent page indicating the service requires the user's location information and e-mail address. If the user does not want to share his or her real e-mail address with the service, the user can change the e-mail address and choose an option to always let the user choose and to not update the profile.

Figure 4:
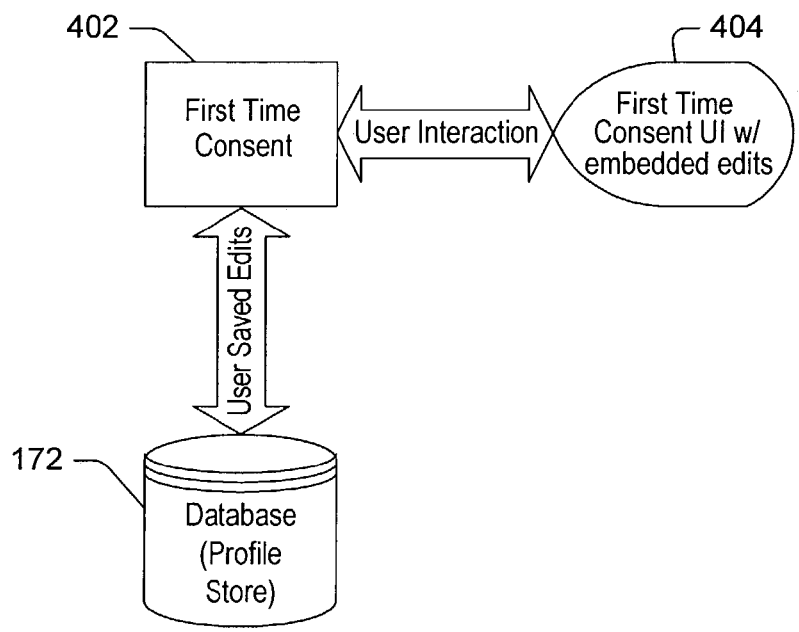
FIG. 4 is an exemplary flow diagram illustrating further aspects of process flow according to one embodiment of the invention.

FIG. 4 illustrates an exemplary operational flow for in-place real time edit. In this instance, a participating service at affiliate server 166 initiates first time consent at 402 in response to user action. Central server 170, for example, presents a user interface including a first time consent page. In turn, client computer 162 displays the first time consent page to the user at 404. In one embodiment, the UI has a number of form fields for accepting information from the user (see FIGS. 6A–C). The form fields for information that is editable during first time consent are empty and can be filled in by the user. The page allows the user to make changes to his or her profile information. If the user chooses to make changes, the first time consent process writes the changes back to the profile store maintained by, for example, database 172.

Advantageously, an exemplary first time consent UI of the invention allows the user to edit information in his or her profile. Giving the user the ability to update, delete, and/or add information during the process of sharing that information helps keep the information in the profile store up-to-date. As a result, the consent-seeking web site/service 166 not only has more information on the user but has better information as well.

One embodiment of the invention provides open profile fields in the UI (see FIGS. 6A–C). The user can edit the information in the open profile fields and save the changes when he or she either grants or denies consent to the site that initiated the first time consent process. In an alternative implementation, the user can edit the information in-line on the first time consent page. In this embodiment, however, the user can choose to not save any edits sent to the site/service. This is more complicated from the user's perspective because he or she could send false information to the site/service, but that information is not recorded or logged by the service maintaining the user profile.

Figure 5:
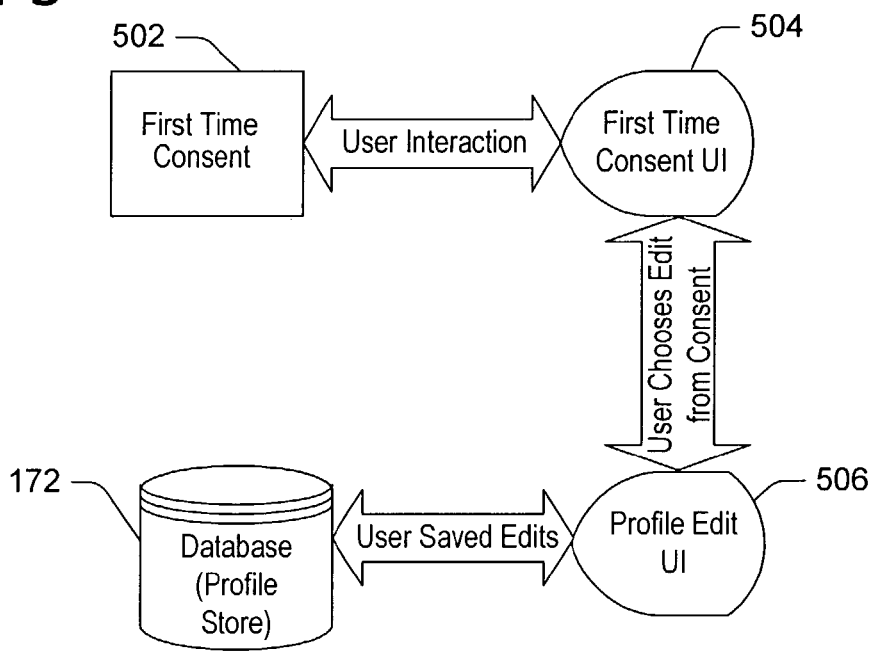
FIG. 5 is an exemplary flow diagram illustrating yet further aspects of process flow according to one embodiment of the invention.

FIG. 5 illustrates another exemplary operational flow for real time user editing of user profile information. In this instance, a participating service at affiliate server 166 initiates first time consent at 502 in response to user action. Central server 170, for example, presents a user interface including a first time consent page. As before, client computer 162 in turn displays the first time consent page to the user at 504. In the embodiment of FIG. 5, the page provides the user with the option of navigating to an edit profile page. If the user chooses this option, central server 170 causes client computer 162 to display the edit profile page to the user at 506. The user can then make any additions or changes to his or her profile information via the edit profile form. If the user chooses to make changes, the first time consent process writes the changes back to the profile store maintained by, for example, database 172.

In this embodiment, central server 170 presents a user interface having a number of form fields for accepting information from the user. The form fields for information that is editable during first time consent are empty and can be filled in by the user. Next to each item that already contains at least some information, the UI presents the user with a link to the edit profile form. Editing the profile fields requires the user to explicitly choose the edit profile option. When the user finishes editing in this example, the user automatically navigates to back to the first time consent page to finish granting or denying consent.

It is to be understood that the invention can also apply to a managed user account (see FIG. 3 at 318). If a minor user, for example, visits a site for the first time, central server 170 renders a request for a parent to sign in to the desired site/service on behalf of the minor. When the parent user signs in, the authentication service operating in accordance with the invention presents the parent with the first time consent page for the minor user. Further to the example, the parent user reviews the page and determines that he or she does not want the site to have the minor user's real postal code. The parent selects an edit profile option and submits the request. The service asks the parent user to sign in again. After confirming the parent's identity, it presents the parent with an edit profile page containing the minor user's information. The parent user can change the postal code or other information for the particular site and does not save the changes to sign-in service user profile. In an alternative embodiment, the UI contains an edit option, which takes the user to the standard edit profile page when selected before returning the user to the first time consent page to finish granting or denying consent.

APPENDIX A provides additional specific examples of the first time consent process.

FIG. 6A, FIG. 6B, and FIG. 6C show exemplary user interfaces for accepting real time edits as part of a first time consent process in accordance with embodiments of the invention. As shown in FIG. 6A, the UI in this example has a number of form fields for accepting information from the user. The form fields for information that is editable during first time consent are empty and can be filled in by the user. Further, the UI of FIG. 6A, as part of a first time consent process, provides an indication to the user whether the information will be shared. In an alternative embodiment, such as illustrated in FIG. 6B, the UI presents the user with a link to an edit profile form. FIG. 6B shows a single link for selecting the edit profile option but it is to be understood that similar links could be provided in connection with each piece of information presented on the page (e.g., next to each field already containing information). Selecting the option of editing the user profile navigates the user to, for example, a separate page presenting a UI for entering edits. FIG. 6C illustrates an exemplary UI that permits the user to enter edits in response to the user selecting the edit profile link. The user can then make any desired additions or changes via the edit profile form.

Figure 7:
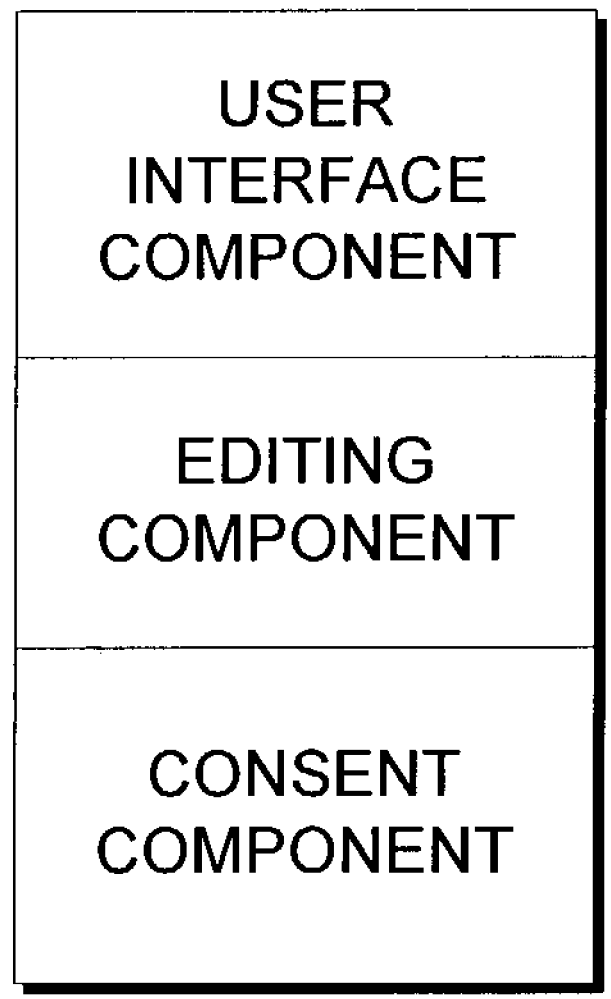
FIG. 7 is a block diagram illustrating an exemplary computer-readable medium according to one embodiment of the invention.

FIG. 7 is a block diagram illustrating an exemplary computer-readable medium according to one embodiment of the invention. As shown, this embodiment of the invention includes a user interface component, an editing component, and a consent component. The user interface component requests information from the user in response to a request from the network server 166 for consent to use the information. The editing component in this embodiment receives information provided by the user via the user interface component. The consent component then allows access by the network server 166 to the information received from the user.

Figure 8:
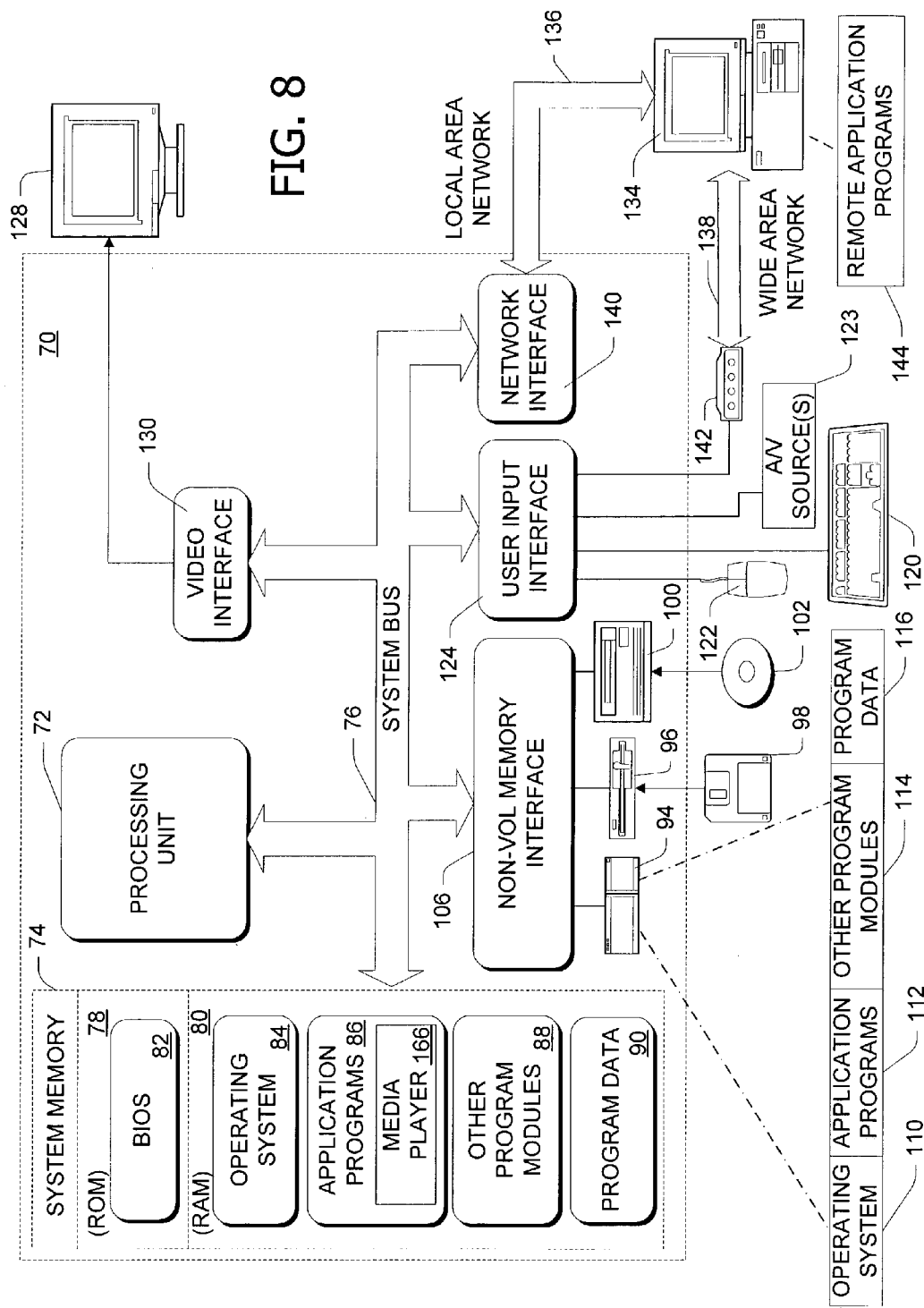
FIG. 8 is a block diagram illustrating exemplary components of a computer for use in the system of FIG. 1.

FIG. 8 shows one example of a general purpose computing device in the form of a computer 70. In one embodiment of the invention, a computer such as the computer 70 is suitable for use in client computer system 162, central server 170, or any of affiliate servers 166.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 8 illustrates operating system 84, application programs 86, other program modules 88, and program data 90.

The computer 70 may also include other removable/non-removable, volatile/nonvolatile computer storage media. For example, FIG. 8 illustrates a hard disk drive 94 that reads from or writes to non-removable, nonvolatile magnetic media. FIG. 8 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 8, provide storage of computer readable instructions, data structures, program modules and other data for the computer 70. In FIG. 8, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 8 include a local area network (LAN) 136 and a wide area network (WAN) 138, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 8 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics including mobile phones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those described herein to provide a user interface to request information from the user in response to a request for consent to use the information, receive information provided by the user via the user interface in response to the request for consent, and allow access to the information received from the user. In another embodiment, computer 70 executes computer-executable instructions such as those described herein to display information previously stored in a user profile associated with the user, provide a form field for editing the user-specific information previously stored in the user profile, and receive information provided by the user via the form field.

Information in this document, including uniform resource locator and other Internet web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

APPENDIX A

Reviewing Consent

Abby is concerned about where she has agreed to share information. After signing in to her portal service (e.g., MSN® network of Internet services), Abby chooses a Privacy Task bar option and arrives at the Privacy Management section of Member Services. Here, Abby can look at all of the policy, or consent, groups for which she has consented to share information about her and her unique identifier. She can also choose to look at all of the sites that comprise each policy group.

Managed Consent

Tamra signs in to Member Services of her multi-site user authentication service (e.g., Microsoft® .NET™ Passport single sign-in service) and chooses a Privacy option. On the Privacy page, Tamra can review where her parents have granted consent for use of her information, the default notification requirement set by her parents, and whether or not her parents have granted continue use during this notification cycle. Tamra cannot make any changes.

Revoking Consent

Joseph has a bad experience while at an affiliate, or partner, site. He decides that he no longer wants the site to get any information about him other than to know when he has signed in. Joseph goes to the Privacy Section of Member Services and revokes consent for sharing information with the site. The site can now find any information specific to Joseph and the site but will not receive any information from Joseph's personal information stores.

Abby signs into Member Services and chooses the Privacy option. From there she chooses the Managed Accounts link and reviews the consent grants for each of her children. When she discovers that she has granted consent to a particular site for Tamra, she revokes consent so that the next time Tamra signs in to the site, his information will not be shared.

What is claimed is:

1. A method of managing consent between a client and at least one network server, said client and said network server being coupled to a data communication network, said network server providing one or more services to a user via the client, said client operating a browser configured to permit the user to communicate on the data communication network, said method comprising:
   providing a user interface via the browser to request information from the user in response to a request from the network server for consent to use the information, said user interface being provided by a central server also coupled to the data communication network;
   receiving information provided by the user via the user interface in response to the request for consent; and
   allowing access by the network server to the information received from the user.

2. The method of claim 1, further comprising maintaining a user profile associated with the user and updating the user profile with the information received from the user via the user interface in response to the request for consent.

3. The method of claim 2, wherein the user interface provided by the central server displays user-specific information previously stored in the user profile.

4. The method of claim 3, wherein the user interface provided by the central server further displays a user-selectable option for editing the user-specific information previously stored in the user profile.

5. The method of claim 4, further comprising providing another user interface via the browser for receiving edits to the user-specific information previously stored in the user profile, said other user interface being provided by the central server in response to the user-selectable option being selected by the user.

6. The method of claim 1, further comprising maintaining a user profile associated with the user, and wherein the user interface provided by the central server displays user-specific information previously stored in the user profile.

7. The method of claim 6, further comprising selectively updating the user profile with the information received from the user via the user interface in response to the request for consent.

8. The method of claim 7, wherein the user interface provided by the central server further displays a user-selectable option for saving the information received from the user via the user interface in the user profile.

9. The method of claim 6, wherein the user interface provided by the central server further displays user-specific information for which the user previously granted consent to the network server.

10. The method of claim 1, wherein the request from the network server for consent is responsive to a request from the user for a selected service to be provided by the network server via the client, and further comprising directing the client from the network server to the central server for providing the user interface to request information from the user.

11. The method of claim 10, further comprising re-directing the user to the network server with the requested information if the user grants consent to the network server for use of the requested information.

12. The method of claim 1, wherein the user interface comprises at least one form field for entering information.

13. The method of claim 1, further comprising maintaining a user profile associated with the user and initiating a first time consent process if the user did not previously grant permission to the network server to use selected user-specific information previously stored in the user profile.

14. The method of claim 13, further comprising continuing the first time consent process after receiving the information provided by the user via the user interface in response to the request for consent.

15. The method of claim 1, wherein the network server is a web server and the data communication network is the Internet.

16. The method of claim 1, wherein the central server is an authentication server of a multi-site user authentication system and the network server is affiliated with authentication server, said authentication server receiving requests to authenticate the user when the user requests one or more services to be provided by the affiliated network server.

17. The method of claim 16, wherein a database associated with the central server stores authentication information for comparison to login information provided by the user for authenticating the user.

18. One or more computer-readable media have computer-executable instructions for performing the method of claim 1.

19. An authentication system comprising:
an authentication server coupled to a data communication network;
an authentication database associated with the authentication server, said authentication database storing authentication information for comparison to login information provided by a user for authenticating the user, said authentication database further storing user-specific information identifying the user with respect to one or more services provided by at least one affiliate server coupled to the data communication network, said affiliate server providing the one or more services to the user via a client coupled to the data communication network;
said authentication server being configured to receive a request from the user for a service to be provided by the affiliate server, said authentication server further being configured to authenticate the user responsive to the request when login information retrieved from the user via the data communication network matches the authentication information stored in the authentication database; and
said authentication server being configured to provide a user interface to request information from the user in response to a request from the affiliate server for consent to use the information, to receive information provided by the user via the user interface in response to the request for consent, and to allow access by the affiliate server to the information received from the user.

20. The system of claim 19, further comprising a database associated with the authentication server for maintaining a user profile, said user profile storing user-specific information and being updated with the information received from the user via the user interface in response to the request for consent.

21. The system of claim 20, wherein the user interface provided by the authentication server displays user-specific information previously stored in the user profile.

22. The system of claim 21, wherein the user interface provided by the authentication server further displays a user-selectable option for editing the user-specific information previously stored in the user profile.

23. The system of claim 22, wherein the authentication server is configured to provide another user interface for receiving edits to the user-specific information previously stored in the user profile, said other user interface being provided by the authentication server in response to the user-selectable option being selected by the user.

24. The system of claim 19, further comprising a database associated with the authentication server for maintaining a user profile, said user interface provided by the authentication server displaying user-specific information previously stored in the user profile.

25. The system of claim 24, wherein the user profile is selectively updated with the information received from the user via the user interface in response to the request for consent.

26. The system of claim 25, wherein the user interface provided by the authentication server further displays a user-selectable option for saving the information received from the user via the user interface in the user profile.

27. The system of claim 24, wherein the user interface provided by the authentication server further displays user-specific information for which the user previously granted consent to the affiliate server.

28. The system of claim 19, wherein the authentication server is configured to re-direct the user to the affiliate server with the requested information if the user grants consent to the affiliate server for use of the requested information.

29. The system of claim 19, wherein the user interface comprises at least one form field for entering information.

30. The system of claim 19, further comprising a database associated with the authentication server for maintaining a user profile, and wherein the authentication server is configured to initiate a first time consent process if the user did not previously grant permission to the affiliate server to use selected user-specific information previously stored in the user profile.

31. The system of claim 19, wherein the affiliate server is a web server and the data communication network is the Internet.

32. In a computer system having a graphical user interface including a display and a user interface selection device, a method of managing consent to use information associated with a user, said method comprising:
sending information previously stored in a user profile associated with the user to a client for displaying to the user;
providing a form field for editing the user-specific information previously stored in the user profile, said form field being provided in response to a request from a network server for consent to use selected information from the user profile; and
receiving information provided by the user via the form field.

33. The method of claim 32, further comprising providing a user-selectable option for editing the information previously stored in the user profile.

34. The method of claim 33, further comprising providing a user interface for receiving edits to the information previously stored in the user profile, said user interface being provided in response to the user-selectable option being selected by the user.

35. The method of claim 34, wherein the user interface is provided to the client for displaying to the user.

36. The method of claim 32, further comprising providing a user-selectable option for updating the information previously stored in the user profile with the information received from the user.

37. The method of claim 32, further comprising sending, to the client for displaying to the user, selected information stored in the user profile for which the user previously granted consent to the network server.

38. The method of claim 32, further comprising initiating a first time consent process if the user did not previously grant permission to the network server to use selected information stored in the user profile.

39. The method of claim 38, further comprising continuing the first time consent process after receiving the information provided by the user in response to the request for consent.

40. One or more computer-readable media have computer-executable instructions for performing the method of claim 32.

41. One or more computer-readable media having computer-executable components for managing consent between a client and at least one network server, said client and said network server being coupled to a data communication network, said network server providing one or more services to a user via the client, said computer-readable media comprising:

a user interface component for requesting information from the user in response to a request from the network server for consent to use the information;

an editing component for receiving information provided by the user via the user interface component in response to the request for consent; and a consent component for allowing access by the network server to the information received from the user.

42. The computer-readable media of claim 41, wherein a central server maintains a user profile storing information associated with the user and wherein the central server is responsive to the editing component for selectively updating the user profile with the information received from the user.

43. The computer-readable media of claim 42, wherein the user interface component displays user-specific information previously stored in the user profile.

44. The computer-readable media of claim 41, wherein the user interface component further displays user-specific information for which the user previously granted consent to the network server.

45. The computer-readable media of claim 41, wherein the request from the network server for consent is responsive to a request from the user for a selected service to be provided by the network server via the client, and the consent component directs directing the client to the network server with the requested information if the user grants consent to the network server for use of the requested information.

46. The computer-readable media of claim 41, wherein the user interface component comprises at least one form field for entering information.

* * * * *